US006898732B1

United States Patent
Trehus et al.

(10) Patent No.: US 6,898,732 B1
(45) Date of Patent: May 24, 2005

(54) AUTO QUIESCE

(75) Inventors: Eric Mathew Trehus, San Jose, CA (US); James Forman, Gilroy, CA (US); Venkataraman Sukavanam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 09/902,827

(22) Filed: Jul. 10, 2001

(51) Int. Cl.[7] .................................................. G06F 11/00
(52) U.S. Cl. ............................ 714/11; 714/12; 714/48
(58) Field of Search ............................. 714/11, 12, 13, 714/9, 43, 48

(56) References Cited

U.S. PATENT DOCUMENTS

| | | | | |
|---|---|---|---|---|
| 5,608,884 A | * | 3/1997 | Potter | 710/124 |
| 5,724,501 A | * | 3/1998 | Dewey et al. | 714/9 |
| 5,815,676 A | * | 9/1998 | Yazdy | 710/113 |
| 5,958,069 A | * | 9/1999 | Kawasaki et al. | 714/11 |
| 6,161,198 A | * | 12/2000 | Hill et al. | 714/15 |
| 6,334,193 B1 | * | 12/2001 | Buzsaki | 714/2 |
| 6,412,027 B1 | * | 6/2002 | Amrany et al. | 710/22 |
| 6,523,138 B1 | * | 2/2003 | Natsume et al. | 714/43 |
| 6,578,158 B1 | * | 6/2003 | Deitz et al. | 714/11 |
| 6,629,184 B1 | * | 9/2003 | Berg et al. | 710/306 |
| 6,675,324 B2 | * | 1/2004 | Marisetty et al. | 714/30 |
| 2001/0020282 A1 | * | 9/2001 | Murotani et al. | 714/9 |
| 2002/0152334 A1 | * | 10/2002 | Holm et al. | 710/2 |

* cited by examiner

*Primary Examiner*—Robert Beausoliel
*Assistant Examiner*—Yolanda L Wilson
(74) *Attorney, Agent, or Firm*—Johnson & McCollom, P.C.

(57) ABSTRACT

A computing device having multiple masters. The device includes a set of masters and at least one target with at least one bus that provides connecting between the masters and the target. A system controller operates to quiesce masters selected from the set of masters in response to an error message. A system error processor handles the error condition after the selected masters have been quiesced.

13 Claims, 4 Drawing Sheets

AUTO QUIESCE

BACKGROUND

1. Field

This disclosure relates to multimaster systems, more particularly to the handling of errors in multimaster systems to avoid error propagation.

2. Background

Most computing devices are multimaster devices. A computing device is any device that has a central processor or controller, memory and can perform some function or task. This includes, but is not limited to, personal computers, most electronic equipment, communications equipment and accessories. A multimaster system is any system that has more than one master. A master is any device that can address other devices using one or more communications buses. Examples include, but again are not limited to, central processing units (CPUs), Network Interface Controllers (NIC), direct memory access (DMA) controllers. For example, a DMA controller is a master because it can generate read and write transactions to targets such as memory.

When several masters exist in a system, errors can propagate from one master to the other. For example, if an error occurs in a multimaster system a processor is notified of the error, typically by an interrupt request. In current systems, other masters in the system may be unaware of the error. Another master may attempt to work with the same component that generated the error, and receive the same error, or bad data without notification of the error. This propagates bad data and/or the error to the next master. The asynchronous nature of these events, make it difficult or impossible to properly diagnose the originating problem.

This causes problems on the local level, within that computing device. There exists a fair bit of latency between when the interrupt occurs, and when the notified processor decodes the error and handles it. During this time, other masters may experience the same error, or propagate wrong data. This problem is magnified when considering networked devices, where the error may actually be passed from one device to another across the network. This can result in unbounded errors and unpredictable results.

SUMMARY

One aspect of the disclosure is a multimaster device. The multimaster device has a set of masters and at least one target. At least one bus provides connection between the masters and the targets. A system controller provides connectivity between the various busses and interlaces, and possibly other functions such as DMA engine or interrupt controller. When an error or interrupt occurs, the system controller determines if this is one that triggers the automatic quiescing of the preselected masters. If it is such an error, the system controller quiesces selected masters from the set of all possible masters. The system controller simultaneously generates an interrupt to one of the processors in the system. This processor may be known as the system error processor. A system processor then clears the error condition and the masters are re-enabled.

BRIEF DESCRIPTION OF THE DRAWINGS

The invention may be best understood by reading the disclosure with reference to the drawings, wherein.

DETAILED DESCRIPTION OF THE EMBODIMENTS

As the term is used here, a multimaster system or device is one that includes more than one master. A master is a component of the device that can address other devices using one or more communications buses. Examples include, but are not limited to, central processing units (CPUs), peripheral component interconnect (PCI) controllers such as an Ethernet controller with a PCI interconnect, direct memory access (DMA) controllers, memory scanner controllers as well as controllers added through expansion slots on the input/output, processor, or memory busses of a system. Masters address targets, which are any components that can be read from or written to. A multimaster device has a set of masters, where the set includes at least two masters.

As mentioned previously, an error can occur in any one of the transactions between a master and a target. Errors could include a parity error on a memory transaction, etc. Typically, when an error occurs, the target of a write transaction communicates the error to the error CPU via interrupt. Since the error CPU may not be the master of the transaction, the master will be unaware of the problem, and continue operation. The target error is not reported to all the masters in the system, so another master may read the bad data and bad data will propagate, possibly onto the network in the form of a corrupted packet.

In general, an approach that centralizes and synchronizes the error handling can overcome some of these problems. If mechanisms existed to quiesce all masters except the designated system error processor, the system error processor can handle the error before other masters in the system have an opportunity to propagate errors or bad data. In addition, in the case of a network device, it prevents error propagation across the network to other devices.

Figure 1:
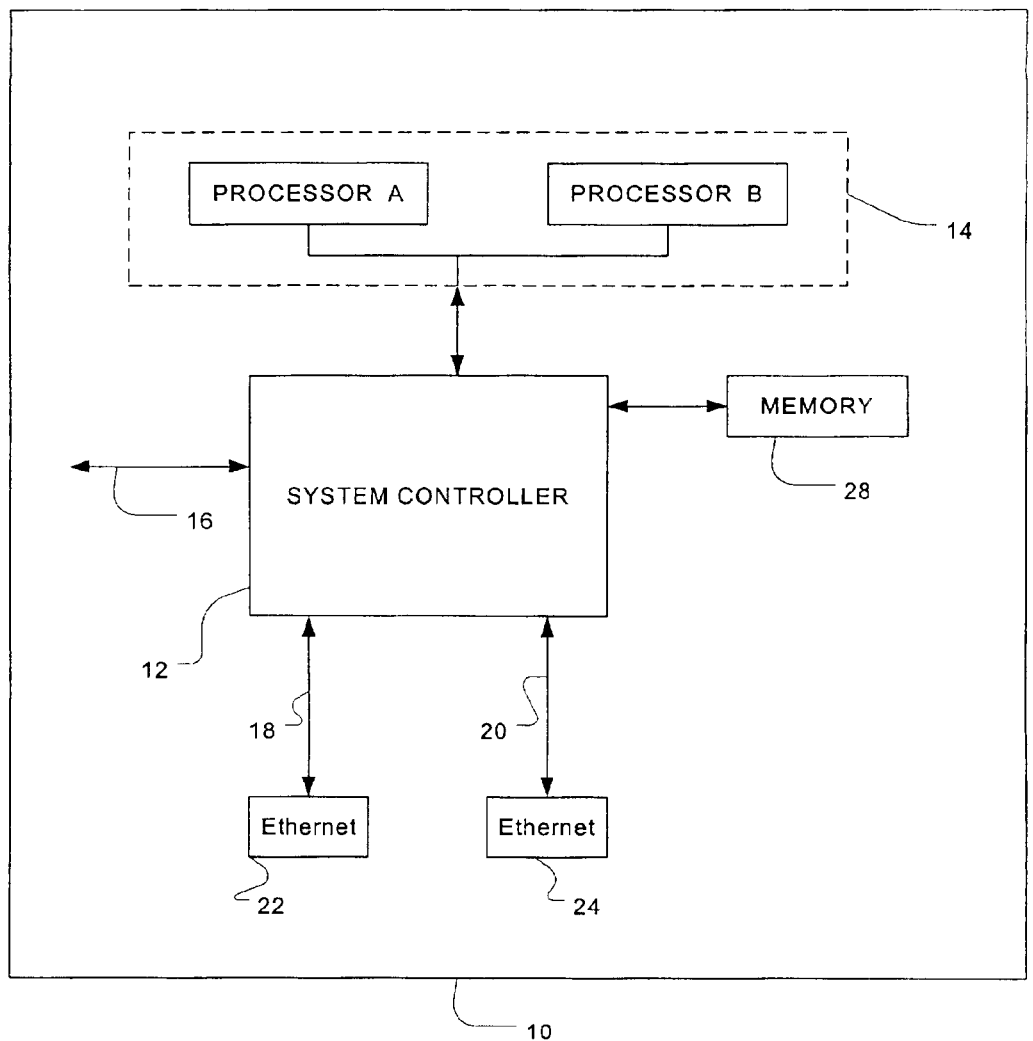
FIG. 1 shows one embodiment of a multimaster device, in accordance with the invention.

A block diagram of one embodiment of a multimaster device with auto quiesce is shown in FIG. 1. The multimaster device 10 has a system controller 12. The system controller has an interface with the central processing unit 14. It must be noted that while the CPU shown here is implied to be two CPUs, it may actually contain one or more processors. In addition, the system controller 12 is connected to an input/output (I/O) bus 16, two PCI buses 18, 20, connected to Ethernet controllers 22 and 24, and a memory 28.

This particular embodiment is for discussion purposes only. No limitations on the scope of the invention are intended, nor should they be implied. The auto quiesce process is handled in this embodiment by the system controller 12. One embodiment of the controller is shown in more detail in FIG. 2. The system controller essentially manages all of the functions of the device, including interface with the CPU. As can be seen, this particular embodiment has a memory interface 32. The system controller includes a PCI controller for each of the two PCI buses from FIG. 1, controllers 36 and 38. For ease of reference, the corresponding PCI busses will be referred to as PCI-A and PCI-B, respectively.

The system controller will also include an interrupt controller 50 as well as a CPU interface 56 to one or more CPUs, such as that shown at 14 in FIG. 1. The primary activity of this interface is to check coherency for data movement within the system controller as well as to transfer instructions and data between the processor and the system-supported memories. This interface can operate as a slave responding to CPU transactions and as a master generating address-only transactions for cache coherency checks.

This system controller could be implemented in several ways. For example, several other types of interfaces could be included, including DMA interfaces, input/output bus interfaces, etc. Further, the physical implementation could vary. In the example above, the system controller is an application specific integrated circuit (ASIC). This is not intended to limit scope of the invention, but is merely to aid in understanding of the invention. The ASIC of FIG. 2 would include all of the necessary interfaces to the various busses used in the system, as well as the CPU interface 56.

Figure 3:
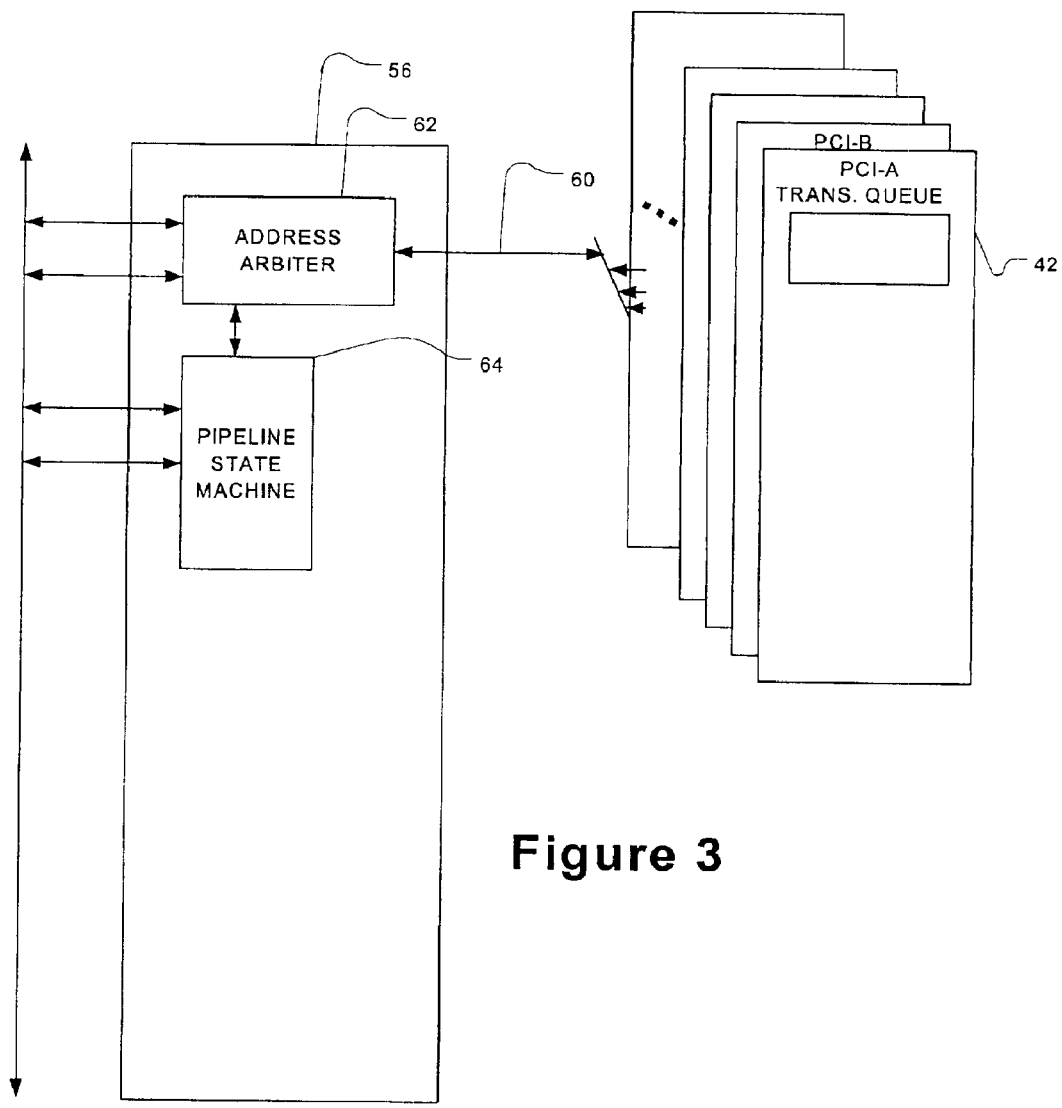
FIG. 3 shows one embodiment of an interface between a system controller and a central processing unit for a multimaster device, in accordance with the invention.

FIG. 3 shows a more detailed diagram of one embodiment of the CPU interface 56, with associated bus layouts. In typical operation, a master may initiate a transaction in the following manner. The initiating master, such as an Ethernet controller on PCI-A generates a write transaction to memory. Internal to the system controller, an arbiter arbitrates among the various masters to give access to all the targets connected through the system controller.

Figure 4:
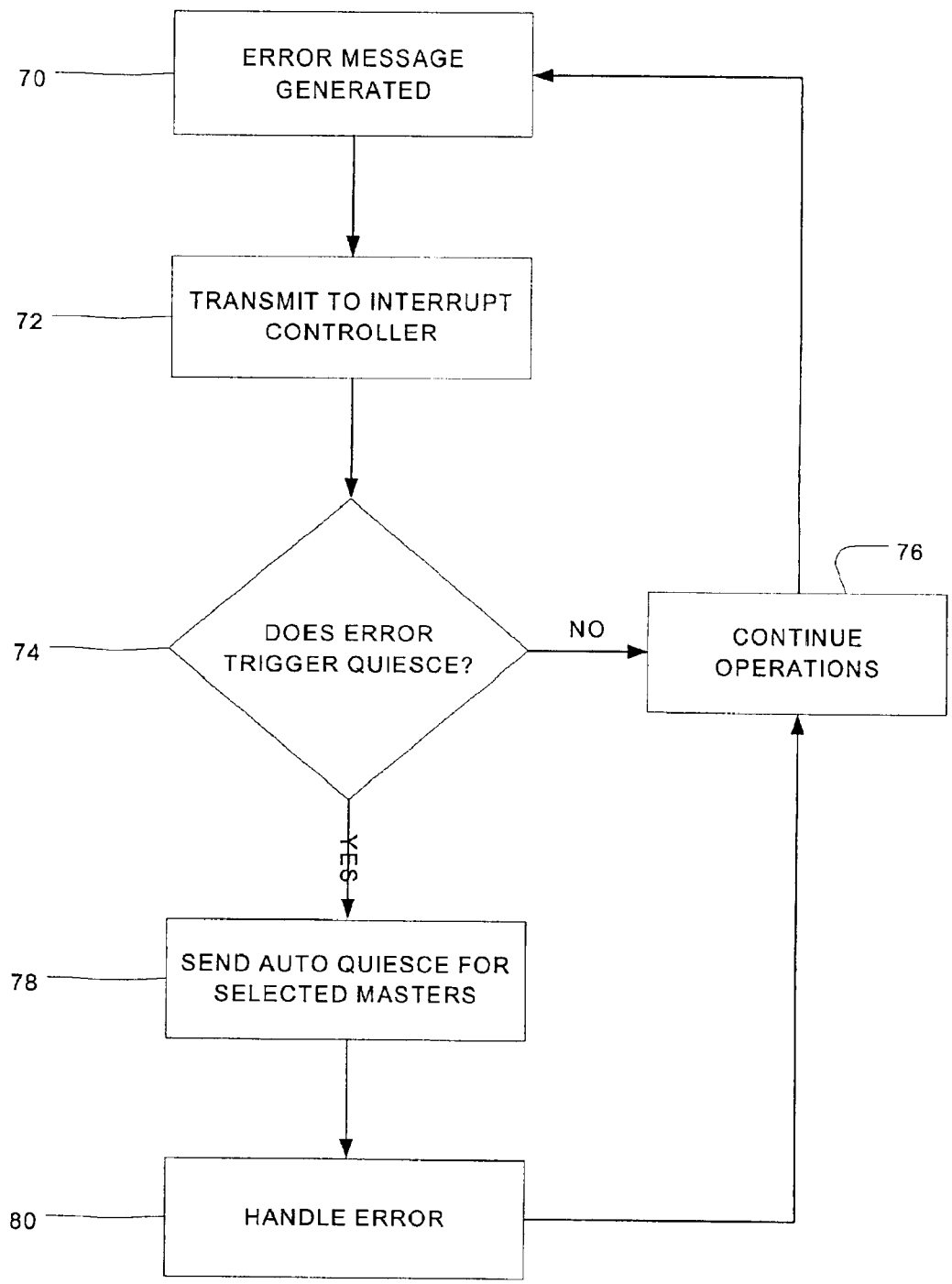
FIG. 4 shows one embodiment of a logic diagram for an auto quiesce signal in a multimaster device, in accordance with the invention.

However, in the case of an error, application of the invention will intentionally stop granting access to a list of selected masters, thus these masters have been quiesced. The CPU which is notified of the error must not be quiesced. The CPU can then safely handle the error. The actual handling of the error and resumption of normal operation is outside the scope of this disclosure. FIG. 4 shows a flowchart of the process for automatically quiescing the masters to prevent propagation of the error.

For purposes of this discussion, the signal which indicated that there is an error somewhere in the device will be referred to as an error message. It is possible that a system controller may refer to this type of signal as something other, such as an interrupt. At 70, the error signal is generated. Typically, this will occur at one of the targets being address by a master, either for a read or write operation.

The error message will then be passed back to the system controller 12 from FIG. 1 at 72. It should be noted that the system controller 12 capable of being in connection with all of the various components shown in FIGS. 2 and 3. The connection may not be 'live' at any one time, as one of the other components on a shared bus may have control of the bus, but each component has the capability of communicating directly with the system controller to relay an interrupt signal.

Up until this point, this process was occurring strictly in 'hardware' in that the interrupt was generated by hardware and passed back to the system controller in accordance with the particular bus protocol used. Based upon this invention, software running on a CPU during system initialization will-have configured the system controller specifying which interrupts will automatically quiesce which masters.

The preconfigured system controller then determines if the error message received is one that triggers auto quiesce at 74. If the error message received is not one that triggers auto quiesce, then operations continue at 76. If the error message received is one that triggers auto quiesce, the auto quiesce is then sent for the selected masters at 78. The actual mechanisms to cause quiesce are discussed in more detail later.

The masters selected to be quiesced might vary from error message to error message. For example, some error messages may occur only from certain targets and only masters that work with those targets may need to be quiesced. In another example, the error may be one that only requires certain masters to be quiesced. For example, the error may only affect DMA controllers, or PCI controllers. Generally, the selected masters will be subset of the set of masters in the multimaster system.

Once the selected masters are quiesced, the error will be handled at 80. Handling the error will probably involve one of the CPUs. Whichever processor is designated to handle the error is referred to here as the system error processor. For example, in one example of an error message, the error message is an interrupt. The interrupt line to the system rises to a high voltage level and the system controller detects the high signal. It then passes an interrupt on to the processor. When the processor clears the error that caused the interrupt, the system controller will then re-enable the masters. The clearing of the error may be detected when the interrupt signal goes low, or if the interrupt registers on the system controller are cleared.

The actual mechanisms to cause the masters to quiesce can be of many and varied approaches. However, as an aid to understanding the invention, an extension can be made of the example discussed above with regard to FIG. 3. When an interrupt results in a quiesce operation, the system controller could cause the arbiter 62 to prevent grants to the selected masters in the system. Typically, this will be done with some sort of signal changing state between the system controller and the arbiter. This in effect freezes the selected masters as they cannot read from nor write to any targets without receiving the necessary grants.

Figure 2:
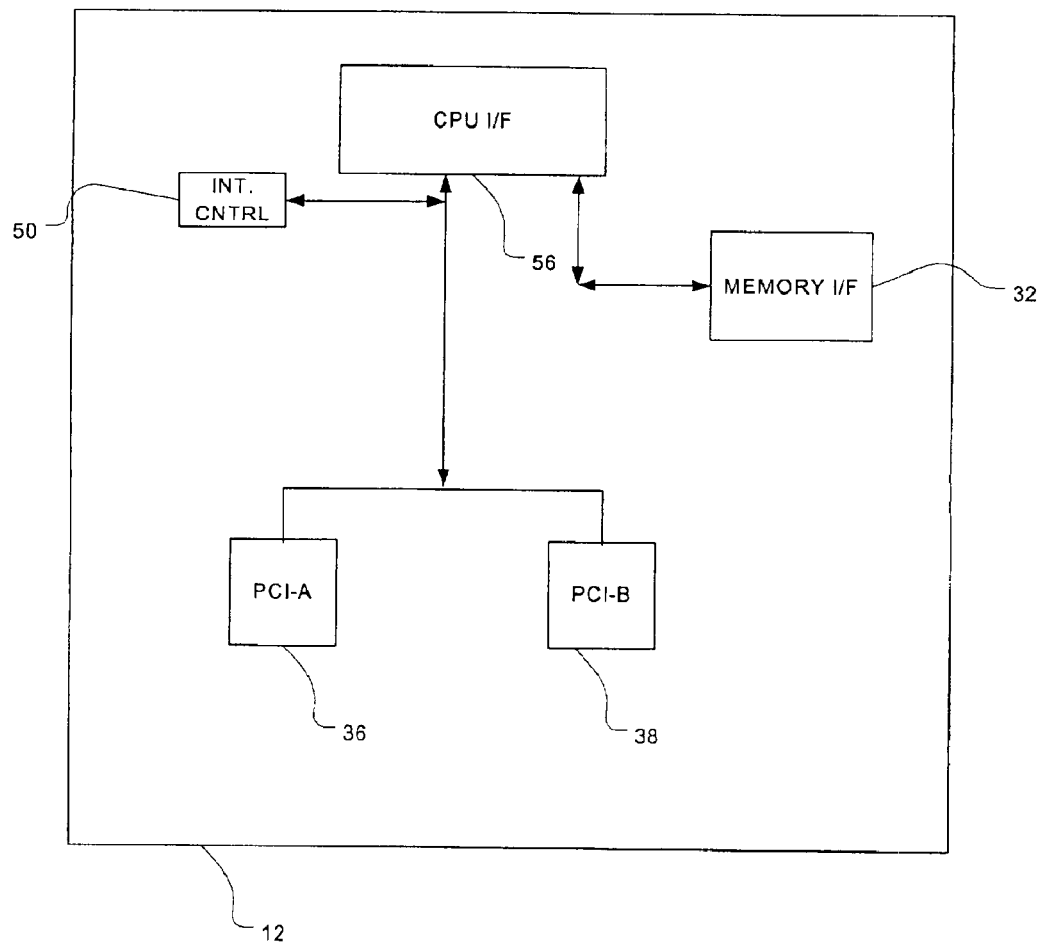
FIG. 2 shows one embodiment of a system controller for a multimaster device, in accordance with the invention.

The discussion up to this point has been very specific to the examples set out in FIGS. 1, 2 and 3. However, the application of the invention is not restricted to this particular implementation or architecture. Generally, application of the invention will result in auto quiesce of all the masters in a multimaster device, except the system error processor. Further, while the examples above included multiple targets and several different busses, they are not necessary. This invention could be applied to any multimaster device with two or more masters, at least one target and at least one bus allowing the masters to address the target.

Similarly, while the system error processor in the above example is a microprocessor, it is possible that other types of components could act as the system error processor. The term system error processor as used here is applied to any master given the responsibility of handling the error.

As mentioned above, the decision as to what level of error triggers the quiesce process would typically be implemented in software. The software would more than likely be executed by a processor, allowing for maximum flexibility, but a system controller could be hardwired by design specifying which interrupts cause what masters to be quiesced.

Since the error conditions that trigger auto quiesce could change, the software could be upgraded to include new errors to trigger auto quiesce or remove old errors that used to trigger auto quiesce, but are no longer necessary. This may occur with changes to the system architecture, replacement of certain components in the field, etc. For example, a new component residing on a PCI bus may be added to the system, and the interrupts generated by that component may be added to those that cause auto quiesce. This could be done by convention, where a device of a certain type has already been preprogrammed to have a certain interrupt mapped to a certain pin. When the new device is inserted and identified, the interrupt will be mapped to a certain pin by convention.

Thus, although there has been described to this point a particular embodiment for a method and apparatus for auto quiesce in a multimaster device, it is not intended that such specific references be considered as limitations upon the scope of this invention except in-so-far as set forth in the following claims.

What is claimed is:

1. A computing device, comprising:
   a set of at least two masters;
   at least one target;
   at least one bus providing connection between the masters and the target;
   a system controller separate from the masters operable to:
      determine if an error message is one that triggers quiesce; and
      quiesce masters other than a master that received the error message from the set of masters if quiesce is triggered; and
   a system error processor operable to handle an error condition indicated by the error message.

2. The device of claim 1, wherein the set of masters includes at least one direct memory access controller.

3. The device of claim 1, wherein the set of masters includes at least one peripheral component interconnect controller.

4. The device of claim 1, wherein at least one bus includes a peripheral component interconnect bus.

5. The device of claim 1, wherein the error message causing the system controller to quiesce the selected masters is programmable.

6. A computing device, comprising:
   at least one means for receiving and providing data;
   a set of means for addressing the means for receiving and providing data;
   a means for providing connection between the set of means for receiving and providing data and the at least one means for addressing;
   a means, separate from the set of means for addressing, for:
      determining if an error message is one that triggers quiesce; and
      quiescing means for addressing other than a means for addressing that received the error message from the set of means for addressing if quiesce is triggered; and
   a means for handling an error condition indicated by the error message.

7. The device of claim 6, wherein the error message causing the system controller to quiesce the selected masters may be programmable.

8. A method for automatically quiescing selected masters in a multimaster device, the method comprising:
   receiving an error message at a system controller indicating an error condition has arisen;
   determining if the error message is one which triggers auto quiesce; and
   generating auto quiesce signals to stop operations in the selected masters.

9. The method of claim 8, wherein the method further comprises re-enabling the selected masters after the error condition has been cleared.

10. The method of claim 8, wherein the error message is an interrupt.

11. The method of claim 8, wherein determining if the error message further is one which triggers auto quiesce further comprises preconfiguring a system controller with the error messages.

12. The method of claim 8, wherein generating auto quiesce signals further comprises sing an address arbiter to halt address grants for the selected masters.

13. A device comprising:
   means for receiving an error message indicating an error condition has arisen;
   means for determining if the error message is one which triggers auto quiesce; and
   means for generating auto quiesce signals to stop operations in the selected masters.

* * * * *

UNITED STATES PATENT AND TRADEMARK OFFICE
CERTIFICATE OF CORRECTION

| | |
|---|---|
| PATENT NO. | : 6,898,732 B1 |
| APPLICATION NO. | : 09/902827 |
| DATED | : May 24, 2005 |
| INVENTOR(S) | : Trehus et al. |

It is certified that error appears in the above-identified patent and that said Letters Patent is hereby corrected as shown below:

At column 1, line 51, please replace "and interlaces" with --and interfaces--

At column 1, line 60, please replace "a system processor" with --a system error processor--

At column 3, line 57, please replace "will-have" with --will have--

Signed and Sealed this

Nineteenth Day of December, 2006

JON W. DUDAS
*Director of the United States Patent and Trademark Office*